(12) United States Patent
Gu et al.

(10) Patent No.: US 9,332,276 B1
(45) Date of Patent: May 3, 2016

(54) VARIABLE-SIZED SUPER BLOCK BASED DIRECT PREDICTION MODE

(75) Inventors: Qunshan Gu, Hayward, CA (US); Wei Jia, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 896 days.

(21) Appl. No.: 13/570,496

(22) Filed: Aug. 9, 2012

(51) Int. Cl.
*H04N 7/30* (2006.01)
*H04N 19/61* (2014.01)
*H04N 19/176* (2014.01)

(52) U.S. Cl.
CPC .............. *H04N 19/61* (2014.11); *H04N 19/176* (2014.11)

(58) Field of Classification Search
CPC .............................. H04N 19/61; H04N 19/176
USPC ........................................................ 375/240.16
See application file for complete search history.

(56) References Cited

U.S. PATENT DOCUMENTS

| | | | |
|---|---|---|---|
| 5,617,541 A | 4/1997 | Albanese et al. | |
| 5,818,967 A | 10/1998 | Bhattacharjee et al. | |
| 6,104,751 A | 8/2000 | Artieri | |
| 6,359,929 B1 | 3/2002 | Boon | |
| 6,381,277 B1 | 4/2002 | Chun et al. | |
| 6,434,197 B1 | 8/2002 | Wang et al. | |
| 6,473,460 B1 | 10/2002 | Topper | |
| 6,542,541 B1 | 4/2003 | Luna et al. | |
| 6,574,273 B1 | 6/2003 | Luna et al. | |
| 6,600,786 B1 | 7/2003 | Prakash et al. | |
| 6,654,418 B2 | 11/2003 | Haskell et al. | |
| 6,687,303 B1 | 2/2004 | Ishihara | |
| 6,711,209 B1 | 3/2004 | Lainema et al. | |
| 6,735,249 B1 | 5/2004 | Karczewicz et al. | |
| 6,775,326 B2 | 8/2004 | Sekiguchi et al. | |
| 6,778,553 B1 | 8/2004 | Chou | |
| 6,847,684 B1 | 1/2005 | Hsu | |
| 7,116,830 B2 | 10/2006 | Srinivasan | |
| 7,173,968 B1 | 2/2007 | Kutka et al. | |

(Continued)

FOREIGN PATENT DOCUMENTS

EP 0634873 1/1995
WO WO02093488 11/2002

(Continued)

OTHER PUBLICATIONS

Hsiang, Shi-ta et al.: "Embedded Image Coding Using Zeroblocks of Subband/wavelet Coefficients and Context Modeling", IEEE Int. Conf. on Circuits and Systems, vol. 3, ISCAS2000, MPEG-4 Workshop and Exhibition atISCAS 2000, Switzerland, May 2000, all pages.

(Continued)

*Primary Examiner* — Tat Chio
*Assistant Examiner* — Nguyen Truong
(74) *Attorney, Agent, or Firm* — Young Basile Hanlon & MacFarlane P.C.

(57) ABSTRACT

Coding a video stream having a plurality of frames is disclosed. A frame of a video stream is processed to determine if direct motion prediction can be applied to the macroblocks of the frame. Macroblocks to which direct motion can be applied are grouped into superblocks. The distribution of superblock size and configuration is analyzed to determine variable-length codes that can vary for each frame or segment encoded using direct prediction superblocks, thereby reducing the number of bits used to indicate superblock encoding in the encoded video stream.

18 Claims, 7 Drawing Sheets

(56) References Cited

U.S. PATENT DOCUMENTS

| | | |
|---|---|---|
| 7,184,482 B2 | 2/2007 | Prakash et al. |
| 7,218,674 B2 | 5/2007 | Kuo |
| 7,253,831 B2 | 8/2007 | Gu |
| 7,263,125 B2 | 8/2007 | Lainema |
| 7,509,553 B2 | 3/2009 | Fuldseth et al. |
| 7,672,377 B2 | 3/2010 | Heng et al. |
| 7,711,052 B2 | 5/2010 | Hannuksela et al. |
| 7,715,475 B1 | 5/2010 | Puri et al. |
| 7,773,670 B1 | 8/2010 | Puri et al. |
| 8,000,546 B2 | 8/2011 | Yang et al. |
| 8,208,545 B2 | 6/2012 | Seo et al. |
| 8,467,448 B2 | 6/2013 | Hsiang et al. |
| 8,767,816 B2 | 7/2014 | Choi et al. |
| 8,774,272 B1 | 7/2014 | Chen |
| 2002/0009153 A1 | 1/2002 | Jeon et al. |
| 2002/0031272 A1 | 3/2002 | Bagni et al. |
| 2002/0071485 A1 | 6/2002 | Caglar et al. |
| 2002/0176502 A1 | 11/2002 | Rose et al. |
| 2002/0181790 A1 | 12/2002 | Nakata |
| 2003/0035477 A1 | 2/2003 | Sekiguchi et al. |
| 2003/0035484 A1 | 2/2003 | Prakash et al. |
| 2003/0138045 A1 | 7/2003 | Murdock et al. |
| 2003/0215018 A1 | 11/2003 | MacInnis et al. |
| 2004/0156437 A1 | 8/2004 | Lainema |
| 2004/0234144 A1 | 11/2004 | Sugimoto et al. |
| 2005/0180500 A1 | 8/2005 | Chiang et al. |
| 2005/0220352 A1 | 10/2005 | Wemelsfelder |
| 2005/0265447 A1 | 12/2005 | Park |
| 2005/0276323 A1 | 12/2005 | Martemyanov et al. |
| 2006/0013313 A1 | 1/2006 | Han et al. |
| 2006/0072664 A1 | 4/2006 | Kwon et al. |
| 2006/0093038 A1 | 5/2006 | Boyce |
| 2006/0098738 A1 | 5/2006 | Cosman et al. |
| 2006/0126729 A1 | 6/2006 | Nakayama |
| 2006/0153304 A1 | 7/2006 | Prakash et al. |
| 2006/0159173 A1 | 7/2006 | Ye et al. |
| 2006/0193386 A1 | 8/2006 | Lin et al. |
| 2006/0200733 A1 | 9/2006 | Stankovic et al. |
| 2006/0251330 A1 | 11/2006 | Toth et al. |
| 2006/0256868 A1* | 11/2006 | Westerman .............. 375/240.24 |
| 2006/0285589 A1 | 12/2006 | Hannuksela |
| 2007/0025441 A1 | 2/2007 | Ugur et al. |
| 2007/0036215 A1 | 2/2007 | Pan et al. |
| 2007/0177673 A1 | 8/2007 | Yang |
| 2007/0217508 A1 | 9/2007 | Shimada et al. |
| 2007/0274385 A1 | 11/2007 | He |
| 2007/0274388 A1 | 11/2007 | Lee et al. |
| 2008/0013630 A1 | 1/2008 | Li et al. |
| 2008/0089409 A1 | 4/2008 | Xu et al. |
| 2008/0152007 A1 | 6/2008 | Sekiguchi et al. |
| 2008/0181299 A1 | 7/2008 | Tian et al. |
| 2008/0181308 A1 | 7/2008 | Wang et al. |
| 2008/0187053 A1 | 8/2008 | Zhao et al. |
| 2008/0240246 A1 | 10/2008 | Lee et al. |
| 2008/0304763 A1 | 12/2008 | Nagori |
| 2008/0310745 A1 | 12/2008 | Ye et al. |
| 2009/0052534 A1 | 2/2009 | Wang et al. |
| 2009/0196342 A1 | 8/2009 | Divorra Escoda et al. |
| 2009/0225834 A1 | 9/2009 | Song et al. |
| 2010/0061444 A1 | 3/2010 | Wilkins et al. |
| 2010/0074332 A1 | 3/2010 | Karczewicz et al. |
| 2010/0086028 A1 | 4/2010 | Tanizawa et al. |
| 2010/0098169 A1 | 4/2010 | Budagavi |
| 2010/0118945 A1 | 5/2010 | Wada et al. |
| 2010/0128796 A1 | 5/2010 | Choudhury |
| 2010/0142761 A1 | 6/2010 | Venkatapuram et al. |
| 2010/0278234 A1 | 11/2010 | Jeong et al. |
| 2010/0329334 A1 | 12/2010 | Kim et al. |
| 2011/0007977 A1 | 1/2011 | Amonou et al. |
| 2011/0235706 A1 | 9/2011 | Demircin et al. |
| 2011/0249743 A1* | 10/2011 | Zhao et al. .............. 375/240.16 |
| 2011/0293001 A1 | 12/2011 | Lim et al. |
| 2012/0014436 A1 | 1/2012 | Segall et al. |
| 2012/0014437 A1 | 1/2012 | Segall et al. |
| 2012/0014438 A1 | 1/2012 | Segall et al. |
| 2012/0014439 A1 | 1/2012 | Segall et al. |
| 2012/0014440 A1 | 1/2012 | Segall et al. |
| 2012/0014444 A1 | 1/2012 | Min et al. |
| 2012/0020408 A1 | 1/2012 | Chen et al. |
| 2012/0057630 A1 | 3/2012 | Saxena et al. |
| 2012/0106637 A1 | 5/2012 | Lee et al. |
| 2012/0106646 A1 | 5/2012 | Cammas et al. |
| 2012/0114035 A1 | 5/2012 | Nakagomi et al. |
| 2012/0114039 A1 | 5/2012 | Wang |

FOREIGN PATENT DOCUMENTS

| | | |
|---|---|---|
| WO | WO2005055612 | 6/2005 |
| WO | WO2005094083 | 10/2005 |
| WO | WO2010146496 | 6/2010 |
| WO | WO2010149900 | 12/2010 |

OTHER PUBLICATIONS

Lengwehasatit, K. and A. Ortega, "Rate-complexity-distortion optimization for quadtree-based DCT coding," in Proc. IEEE Int. Conf. Image Processing Vancouver, BC, Canada, 2000.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

Bankoski et al. "VP8 Data Format and Decoding Guide; draft-bankoski-vp8-bitstream-02" Network Working Group. Dated May 18, 2011.

Bankoski et al. "Technical Overview of VP8, an Open Source Video Codec for the Web". Dated Jul. 11, 2011.

Bankoski, J., Koleszar, J., Quillio, L., Salonen, J., Wilkins, P., and Y. Xu, "VP8 Data Format and Decoding Guide", RFC 6386, Nov. 2011.

Mozilla, "Introduction to Video Coding Part 1: Transform Coding", Video Compression Overview, Mar. 2012, 171 pp.

(56) References Cited

OTHER PUBLICATIONS

Chen, Michael C., et al.; "Design and Optimization of a Differentially Coded Variable Block Size Motion Compensation System", IEEE 1996, 4 pp.

Chen, Xing C., et al.; "Quadtree Based Adaptive Lossy Coding of Motion Vectors", IEEE 1996, 4 pp.

Chung R H Y et al. "Efficient Block-Based Motion Segmentation Method using Motion Vector Consistency"; Proceedings of the Ninth Conference on Machine Vision Application: Tsukuba Science City, Japan; May 16-18, 2005.

Ebrahimi T Ed—Institute of Electrical and Electronics Engineers: "A new technique for motion field segmentation and coding for very low bitrate video coding applications"; Proceedings of the International Conference on Image Processing (ICIP); Austin, Nov. 13-16, 1994.

Glaser-Garrett, Jason, "A novel macroblock-tree algorithm for high-performance optimization of dependent video coding in H.264/AVC", Department of Computer Science, Harvey Mudd College, Date Unknown, 12 pp.

Guillotel, Philippe, et al.; "Comparison of motion vector coding techniques", SPIE vol. 2308, 1994, 11 pp.

Han et al., "Jointly Optimized Spatial Prediction and Block Transform for Video and Image Coding," IEEE Transactions on Image Processing, vol. 21, No. 4 (Apr. 2012).

Han et al., "Toward Jointly Optimal Spatial Prediction and Adaptive Transform in Video/Image Coding," ICASSP 2010 (Dallas, TX, Mar. 14-19, 2010).

Karczewicz, Marta, et al.; "Video Coding Using Motion Compensation With Polynomial Motion Vector Fields", IEEE COMSOC EURASIP, First International Workshop on Wireless Image/Video Communications—Sep. 1996, 6 pp.

Kim, Jong Won, et al.; "On the Hierarchical Variable Block Size Motion Estimation Technique for Motion Sequence Coding", SPIE Visual Communication and Image Processing 1993, Cambridge, MA, Nov. 8, 1993, 29 pp.

Liu, Bede, et al.; "A simple method to segment motion field for video coding", SPIE vol. 1818, Visual Communications and Image Processing 1992, 10 pp.

Liu, Bede, et al.; "New Fast Algorithms for the Estimation of Block Motion Vectors", IEEE Transactions on Circuits and Systems for Video Technology, vol. 3, No. 2, Apr. 1993, 10 pp.

Luttrell, Max, et al.; "Simulation Results for Modified Error Resilient Syntax With Data Partitioning and RVLC", ITU—Telecommunications Standardization Sector, Study Group 16, Video Coding Experts Group (Question 15), Sixth Meeting: Seoul, South Korea, Nov. 2, 1998, 34 pp.

Martin, Graham R., et al.; "Reduced Entropy Motion Compensation Using Variable Sized Blocks", SPIE vol. 3024, 1997, 10 pp.

Nicolas, H., et al.; "Region-based motion estimation using deterministic relaxation schemes for image sequence coding", IEEE 1992, 4 pp.

Nokia, Inc., Nokia Research Center, "MVC Decoder Description", Telecommunication Standardization Sector, Study Period 1997-2000, Geneva, Feb. 7, 2000, 99 pp.

Orchard, Michael T.; "Exploiting Scene Structure in Video Coding", IEEE 1991, 5 pp.

Orchard, Michael T.; "Predictive Motion-Field Segmentation for Image Sequence Coding", IEEE Transactions on Circuits and Systems for Video Technology, vol. 3, No. 1, Feb. 1993, 17 pp.

Park, Jun Sung, et al., "Selective Intra Prediction Mode Decision for H.264/AVC Encoders", World Academy of Science, Engineering and Technology 13, (2006).

Schiller, H., et al.; "Efficient Coding of Side Information in a Low Bitrate Hybrid Image Coder", Signal Processing 19 (1990) Elsevier Science Publishers B.V. 61-73, 13 pp.

Schuster, Guido M., et al.; "A Video Compression Scheme With Optimal Bit Allocation Among Segmentation, Motion, and Residual Error", IEEE Transactions on Image Processing, vol. 6, No. 11, Nov. 1997, 16 pp.

Series H: Audiovisual and Multimedia Systems, Infrastructure of audiovisual services—Coding of moving video, Video coding for low bit rate communication, International Telecommunication Union, ITU-T Recommendation H.263, Feb. 1998, 167 pp.

Steliaros, Michael K., et al.; "Locally-accurate motion estimation for object-based video coding", SPIE vol. 3309, 1997, 11 pp.

Stiller, Christoph; "Motion-Estimation for Coding of Moving Video at 8 kbit/s with Gibbs Modeled Vectorfield Smoothing", SPIE vol. 1360 Visual Communications and Image Processing 1990, 9 pp.

Strobach, Peter; "Tree-Structured Scene Adaptive Coder", IEEE Transactions on Communications, vol. 38, No. 4, Apr. 1990, 10 pp.

Wiegand, Thomas, et al.; "Long-Term Memory Motion-Compensated Prediction", Publication Unknown, Date Unknown, 15 pp.

Wiegand, Thomas, et al.; "Rate-Distortion Optimized Mode Selection for Very Low Bit Rate Video Coding and the Emerging H.263 Standard", IEEE Transactions on Circuits and Systems for Video Technology, vol. 6, No. 2, Apr. 1996, 9 pp.

Wright, R. Glenn, et al.; "Multimedia—Electronic Technical Manual for ATE", IEEE 1996, 3 pp.

Zhang, Kui, et al.; "Variable Block Size Video Coding With Motion Prediction and Motion Segmentation", SPIE vol. 2419, 1995, 9 pp.

Cicconi et al., "Efficient Region-Based Motion Estimation and Symmetry Oriented Segmentation for Image Sequence Coding," IEEE Trans. on Circuits and Systems for Video Technology, vol. 4, No. 3, Jun. 1994, pp. 357-364.

Hongliang Li; King Ngi Ngan; Zhenyu Wei, "Fast anad Efficient Method for Block Edge Classification and its Application in H.264/AVC Video Coding." Circuits and Systems for Video Technology, IEEE Transactions on, vol. 18, No. 6, pp. 756, 768, Jun. 2008.

Salembier et al., "Segmentation-Based Video Coding system Allowing the Manipulation of Objects," IEEE Trans. on Circuits and Systems for Video Technology, vol. 7, No. 1, Feb. 1997, pp. 60-74.

\* cited by examiner

VARIABLE-SIZED SUPER BLOCK BASED DIRECT PREDICTION MODE

TECHNICAL FIELD

This disclosure relates to encoding and decoding video data using direct prediction.

BACKGROUND

Digital video streams typically represent video using a sequence of frames. Each frame can include a number of blocks, which in turn may contain information describing the value of color, brightness or other attributes for pixels. The amount of data in a typical video stream is large, and transmission and storage of video can use significant computing or communications resources. Various approaches have been proposed to reduce the amount of data in video streams, including compression and other encoding techniques. These approaches can involve predicting data of a frame using motion vectors and data from other frames.

SUMMARY

Disclosed herein are implementations of systems, methods and apparatuses for encoding and decoding a video stream of frames having a plurality of macroblocks. One aspect of the disclosed implementations is a method for encoding a video stream of frames, each frame having a plurality of macroblocks, including determining a motion vector predictor for one or more macroblocks of a frame, generating a residual error for the one or more macroblocks using the motion vector predictor, deciding, based on the residual error, whether to encode the one or more macroblocks using direct prediction, combining those of the macroblocks to be encoded using direct prediction into at least one superblock, each superblock formed of at least two macroblocks to be encoded using direct prediction, encoding the at least one superblock using direct prediction into a bitstream, and including a variable length code in the bitstream that indicates a size of the at least one superblock.

Another aspect of the disclosed implementations is a method for decoding a video stream of frames, each frame having a plurality of macroblocks, including receiving a frame of a video stream to be decoded, determining, based on a header of the frame, a variable length code defining sizes of one or more superblocks in the frame, each superblock formed of at least two macroblocks encoded using direct prediction, and selecting a superblock of the frame. The method includes determining a size of the superblock based on a header of the superblock and the variable length code, a size of the superblock indicating a number of macroblocks belonging to the superblock, and decoding those macroblocks belonging to the superblock using direct prediction. Finally, the method includes decoding any macroblocks of the frame that do not belong to the one or more superblocks.

An exemplary apparatus for encoding a video stream of frames according to the teachings herein, each frame having a plurality of macroblocks, includes a memory and a processor. The processor is configured to execute instructions stored in the memory to determine a motion vector predictor for one or more macroblocks of a frame, generate a residual error for the one or more macroblocks using the motion vector predictor, decide, based on the residual error, whether to encode the one or more macroblocks using direct prediction, combine those of the macroblocks to be encoded using direct prediction into at least one superblock, each superblock formed of at least two macroblocks to be encoded using direct prediction, encode the at least one superblock using direct prediction into a bitstream, and include a variable length code in the bitstream that indicates a size of the at least one superblock.

Variations in these and other implementations will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Digital video is used for various purposes including, for example, remote business meetings via video conferencing, high definition video entertainment, video advertisements, and sharing of user-generated videos. As technology is evolving, users have higher expectations for video quality and expect high resolution video even when transmitted over communications channels having limited bandwidth.

One way to reduce the number of bits in an encoded video stream while maintaining acceptable video quality is to encode macroblocks using direct motion prediction, where intra-frame motion prediction is performed by re-using motion vectors from a previous frame. The bit savings from direct prediction are mitigated, however, by the need to add bits to each block (such as a 16×16 macroblock) to indicate which type of prediction was used to encode the block. Aspects of disclosed embodiments improve encoding and transmission or storage efficiency of video streams by constructing superblocks comprising a larger number of pixels. Superblocks can be formed by, for example, combining macroblocks depending upon calculated motion vectors. Then, the superblocks can be encoded direct prediction. Since motion vectors for previous frames are re-used, no new motion vectors need to be included in the video stream along with the superblock residual data.

Combining macroblocks in to superblocks with similar motion prediction attributes can achieve bit savings by reducing the number of bits used to indicate the motion prediction since fewer superblocks are included in the video stream. Additional bit savings can be realized by encoding the bits that indicate the size and shape of the superblock into a variable length field where the most commonly used superblocks are encoded using fewer bits. Details of implementations taught herein can first be obtained by reference to a system in which the teachings can be implemented.

Figure 1:
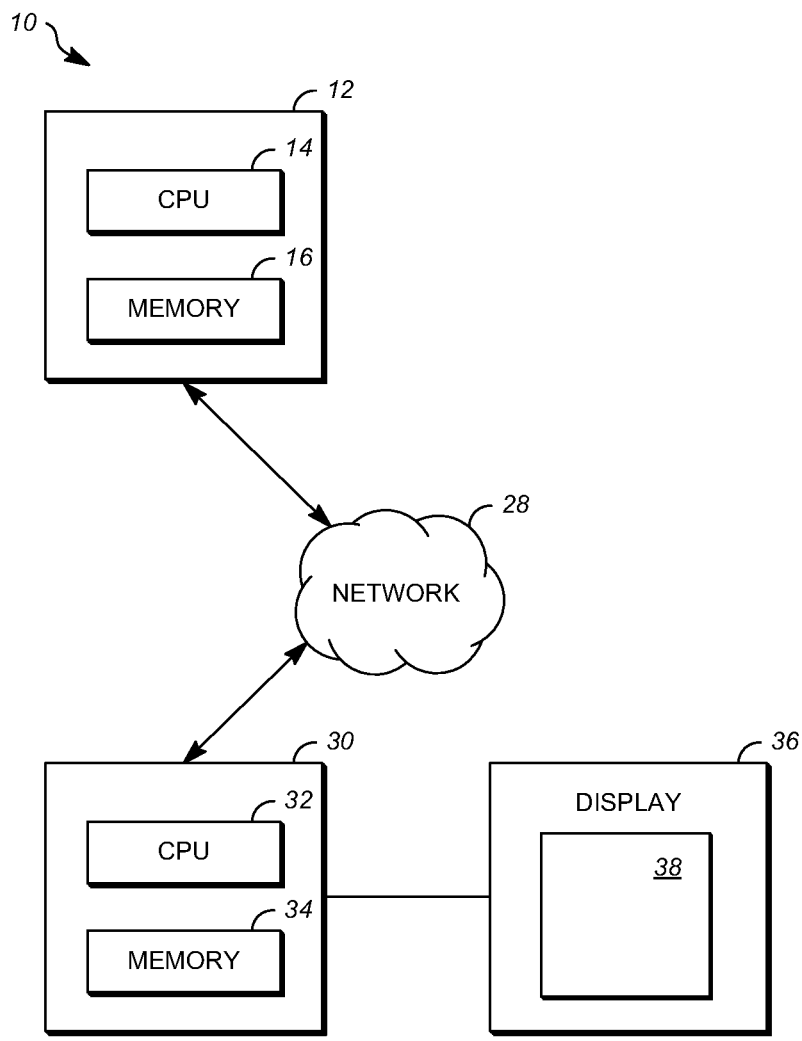
FIG. 1 is a schematic of a video encoding and decoding system.

FIG. 1 is a schematic of a video encoding and decoding system 10. An exemplary transmitting station 12 can be, for example, a computing device having an internal configuration of hardware including a processor such as a central processing unit (CPU) 14 and a memory 16. CPU 14 can be a controller for controlling the operations of transmitting station 12. CPU 14 is connected to memory 16 by, for example, a memory bus. Memory 16 can be read only memory (ROM), random access memory (RAM) or any other suitable memory device. Memory 16 can store data and program instructions which are used by CPU 14. Other suitable implementations of transmitting station 12 are possible. For example, the processing of transmitting station 12 can be distributed among multiple devices. Throughout this disclosure, the term "computing device" includes any device capable of processing information including without limitation: servers, hand-held devices, laptop computers, desktop computers, special purpose computers, and general purpose computers programmed to perform the techniques described herein.

A network 28 can connect transmitting station 12 and a receiving station 30 for encoding and decoding of the video stream. Specifically, the video stream can be encoded in transmitting station 12 and the encoded video stream can be decoded in receiving station 30. Network 28 can, for example, be the Internet. The network 28 can also be a local area network (LAN), wide area network (WAN), virtual private network (VPN), a cellular telephone network or any other means of transferring the video stream from transmitting station 12 to, in this example, receiving station 30.

Receiving station 30, in one example, can be a computing device having an internal configuration of hardware including a processor such as a CPU 32 and a memory 34. CPU 32 can be a controller for controlling the operations of receiving station 30. CPU 32 is connected to memory 34 by, for example, a memory bus. Memory 34 can be ROM, RAM or any other suitable memory device. Memory 34 can store data and program instructions that are used by CPU 32. Other suitable implementations of receiving station 30 are possible. For example, the processing of receiving station 30 can be distributed among multiple devices.

A display 36 configured to display a video stream can be connected to receiving station 30. Display 36 can be implemented in various ways, including by a liquid crystal display (LCD), a cathode-ray tube (CRT) or a light emitting diode (LED) display, such as an OLED display. Display 36 is coupled to CPU 32 and can be configured to display a rendering, or screen image, 138 of the video stream decoded by a decoder in receiving station 30.

In the implementations described, for example, an encoder is in transmitting station 12 and a decoder is in receiving station 30 as instructions in memory or a component separate from memory. However, an encoder or decoder can be connected to a respective station 12, 30 rather than in it. Further, one implementation can omit network 28 and/or display 36. In another implementation, a video stream can be encoded and then stored for transmission at a later time to receiving station 30 or any other device having memory. In one implementation, a video stream is received by receiving station 30 (e.g., via network 28, a computer bus and/or some communication pathway) and stored for later decoding. In another implementation, additional components can be added to encoder and decoder system 10. For example, a display or a video camera can be attached to transmitting station 12 to capture the video stream to be encoded. In an exemplary implementation, a real-time transport protocol (RTP) is used for transmission of the encoded video. In another implementation, a transport protocol other than RTP may be used, e.g., an HTTP-based video streaming protocol.

Figure 2:
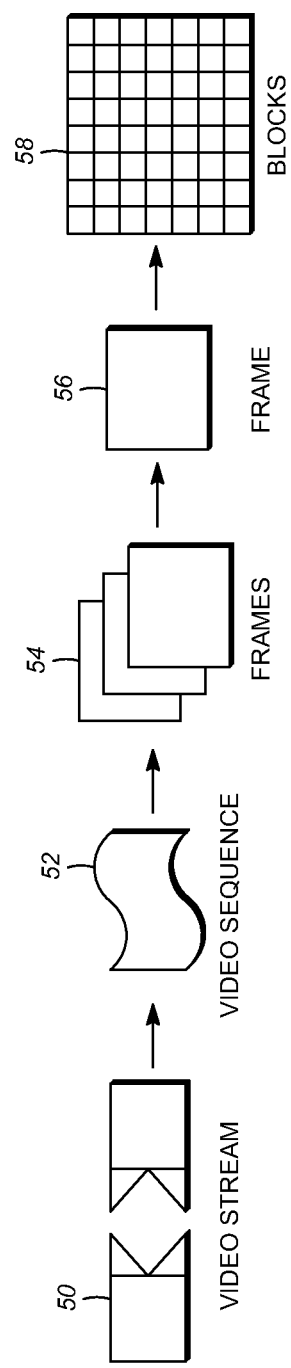
FIG. 2 is a diagram of a typical video stream to be encoded and decoded.

FIG. 2 is a diagram of a typical video stream 50 to be encoded and subsequently decoded. Video stream 50 includes a video sequence 52. At the next level, video sequence 52 includes a number of adjacent frames 54. While three frames are depicted in adjacent frames 54, video sequence 52 can include any number of adjacent frames. Adjacent frames 54 can then be further subdivided into individual frames, e.g., a single frame 56. At the next level, single frame 56 can be divided into a series of blocks 58, which can contain data corresponding to, for example, 16×16 pixels in frame 56. Each block 58 can contain luminance and chrominance data for the corresponding pixels. Blocks 58 can also be of any other suitable size such as 16×8 pixel groups or 8×16 pixel groups. Blocks may also be referred to as macroblocks, and these terms will be used interchangeably herein.

Figure 3:
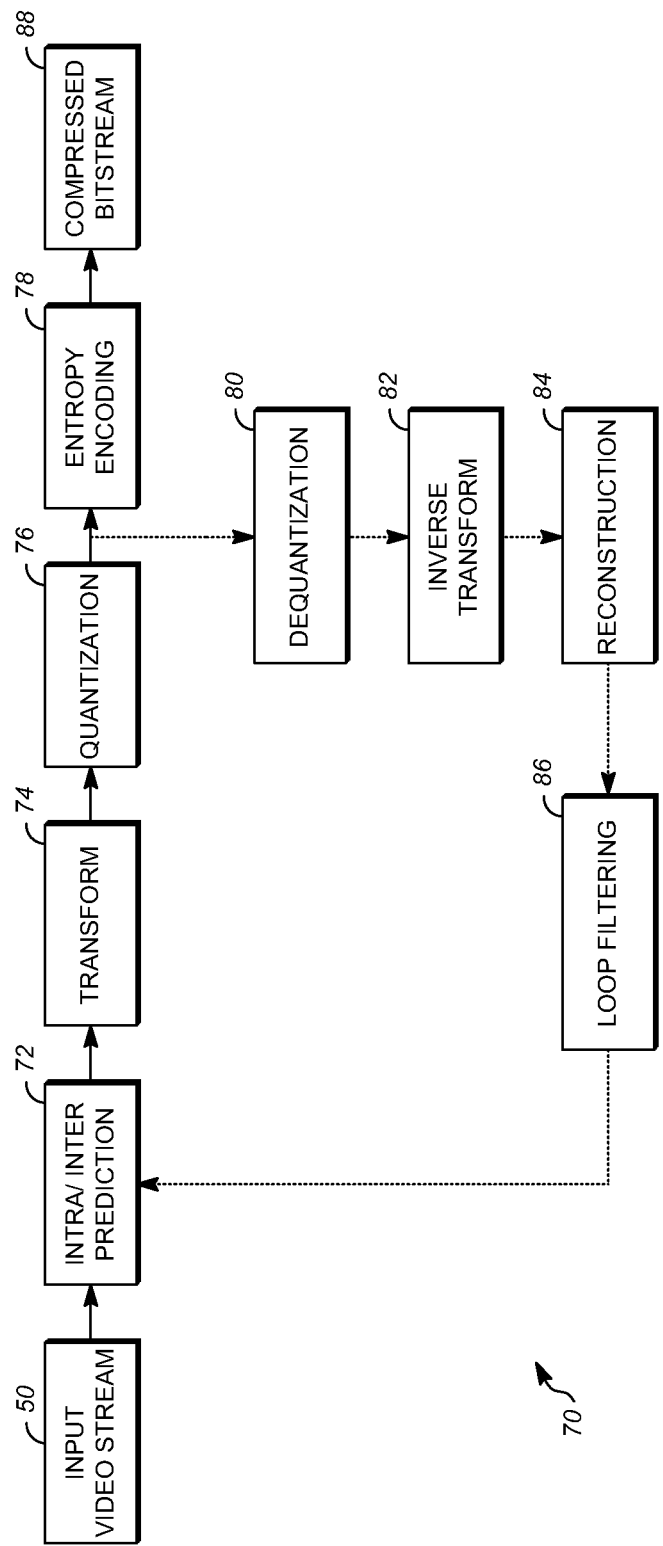
FIG. 3 is a block diagram of a video compression system in accordance with one implementation.

FIG. 3 is a block diagram of an encoder 70 in accordance with one implementation. Encoder 70 can be implemented, as described above, in transmitting station 12, such as by providing a computer software program stored in memory 16, for example. The computer software program can include machine instructions that, when executed by CPU 14, cause encoder 70 to encode video data in the manner described in FIG. 3. Encoder 70 can also be implemented as specialized hardware included, for example, in transmitting station 12. Encoder 70 has the following stages to perform the various functions in a forward path (shown by the solid connection lines) to produce an encoded or a compressed bitstream 88 using an input video stream 50: an intra/inter prediction stage 72, a transform stage 74, a quantization stage 76, and an entropy encoding stage 78. Encoder 70 may also include a reconstruction path (shown by the dotted connection lines) to reconstruct a frame for prediction and encoding of future blocks. In FIG. 3, encoder 70 has the following stages to perform the various functions in the reconstruction path: a dequantization stage 80, an inverse transform stage 82, a reconstruction stage 84, and a loop filtering stage 86. Other structural variations of encoder 70 can be used to encode video stream 50.

When video stream 50 is presented for encoding, each frame 56 within video stream 50 is processed in units of blocks. At intra/inter prediction stage 72, each block can be encoded using either intra-frame prediction (i.e., within a single frame) or inter-frame prediction (i.e. from frame to frame). In either case, a prediction block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 3, the prediction block can be subtracted from the current block at intra/inter prediction stage 72 to produce a residual block (residual). Transform stage 74 transforms the residual into transform coefficients in, for example, the frequency domain. Examples of block-based transforms include the Karhunen-Loève Transform (KLT), the Discrete Cosine Transform (DCT), and the Singular Value Decomposition Transform (SVD). In one example, the DCT transforms the block into the frequency domain. In the case of DCT, the transform coefficient values are based on spatial frequency, with the lowest frequency (i.e., DC) coefficient at the top-left of the matrix and the highest frequency coefficient at the bottom-right of the matrix.

Quantization stage 76 converts the transform coefficients into discrete quantum values, which are referred to as quantized transform coefficients, using a quantizer or quantization level. The quantized transform coefficients are then entropy encoded by entropy encoding stage 78. The entropy-encoded coefficients, together with other information used to decode the block, which may include for example the type of prediction used, motion vectors, and quantizer, are then output to compressed bitstream 88. Compressed bitstream 88 can be formatted using various techniques, such as variable length encoding (VLE) and arithmetic coding. Compressed bitstream 88 can also be referred to as an encoded video stream and the terms will be used interchangeably herein.

The reconstruction path in FIG. 3 (shown by the dotted connection lines) can be used to help ensure that both encoder 70 and a decoder 100 (described below) use the same reference frames to decode compressed bitstream 88. The reconstruction path performs functions that are similar to functions that take place during the decoding process that are discussed in more detail below, including dequantizing the quantized transform coefficients at dequantization stage 80 and inverse transforming the dequantized transform coefficients at inverse transform stage 82 to produce a derivative residual block (derivative residual). At reconstruction stage 84, the prediction block that was predicted at intra/inter prediction stage 72 can be added to the derivative residual to create a reconstructed block. Loop filtering stage 86 can be applied to the reconstructed block to reduce distortion such as blocking artifacts.

Other variations of encoder 70 can be used to encode compressed bitstream 88. For example, a non-transform based encoder 70 can quantize the residual signal directly without transform stage 74. In another embodiment, an encoder 70 can have quantization stage 76 and dequantization stage 80 combined into a single stage.

Figure 4:
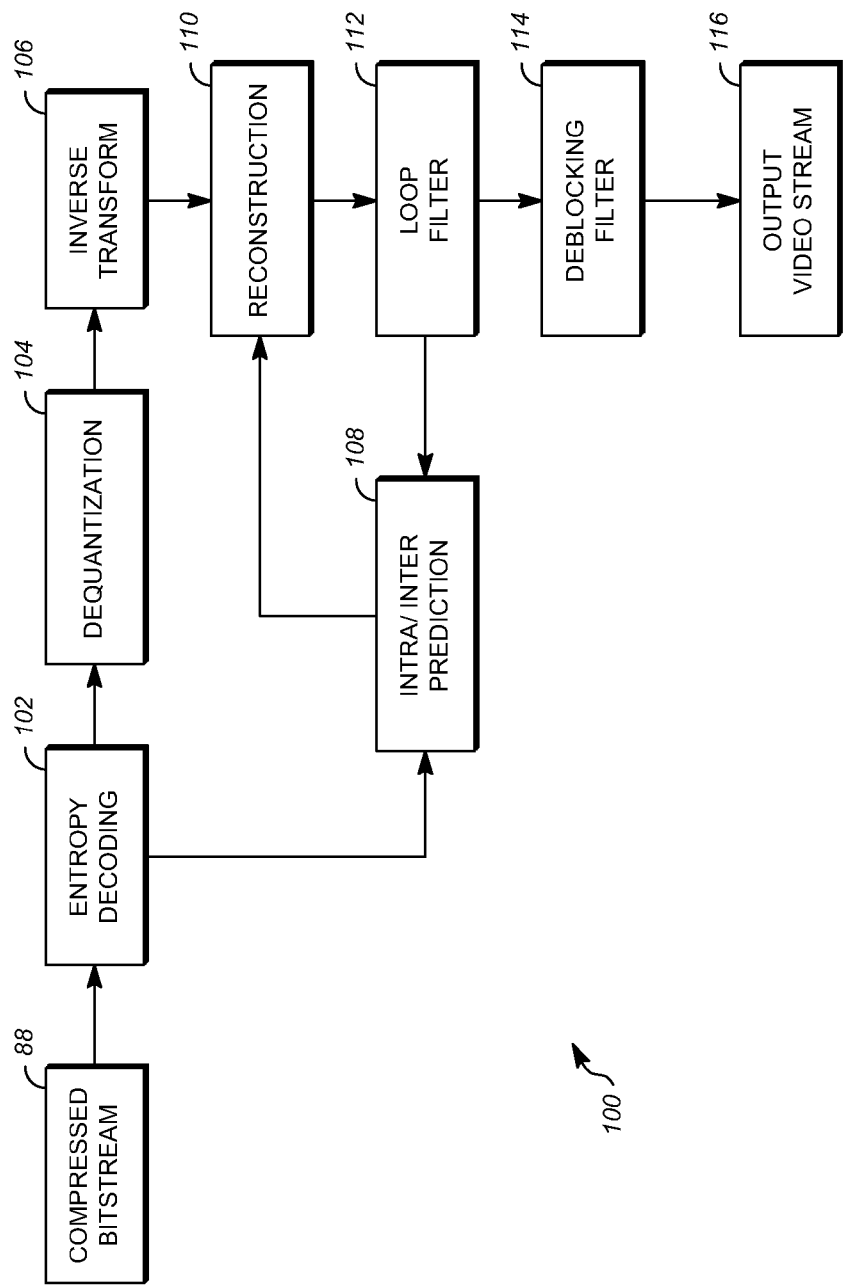
FIG. 4 is a block diagram of a video decompression system in accordance with another implementation.

FIG. 4 is a block diagram of a decoder 100 in accordance with another implementation. Decoder 100 can be implemented, as described above, in receiving station 30, such as through the provision of a computer software program stored in memory 34 for example. The computer software program can include machine instructions that, when executed by CPU 32, cause receiving station 30 to decode video data in the manner described in FIG. 4. Decoder 100 can also be implemented as specialized hardware included, for example, in receiving station 30.

Decoder 100, similar to the reconstruction path of encoder 70 discussed above, includes in one example the following stages to perform various functions to produce an output video stream 116 from compressed bitstream 88: an entropy decoding stage 102, a dequantization stage 104, an inverse transform stage 106, an intra/inter prediction stage 108, a reconstruction stage 110, a loop filtering stage 112 and a deblocking filtering stage 114. Other structural variations of decoder 100 can be used to decode compressed bitstream 88.

When compressed bitstream 88 is presented for decoding, the data elements within compressed bitstream 88 can be decoded by entropy decoding stage 102 to produce a set of quantized transform coefficients. Dequantization stage 104 dequantizes the quantized transform coefficients, and inverse transform stage 106 inverse transforms the dequantized transform coefficients to produce a derivative residual that can be identical to that created by the inverse transform stage 82 in encoder 70. Using header information decoded from compressed bitstream 88, decoder 100 can use intra/inter prediction stage 108 to create the same prediction block as was created in encoder 70, e.g., at intra/inter prediction stage 72. At reconstruction stage 110, the prediction block can be added to the derivative residual to create a reconstructed block. Loop filtering stage 112 can be applied to the reconstructed block to reduce blocking artifacts. Deblocking filtering stage 114 can be applied to the reconstructed block to reduce blocking distortion, and the result is output as output video stream 116. Output video stream 116 can also be referred to as a decoded video stream and the terms will be used interchangeably herein.

Other variations of decoder 100 can be used to decode compressed bitstream 88. For example, decoder 100 can produce output video stream 116 without deblocking filtering stage 114.

Figure 5:
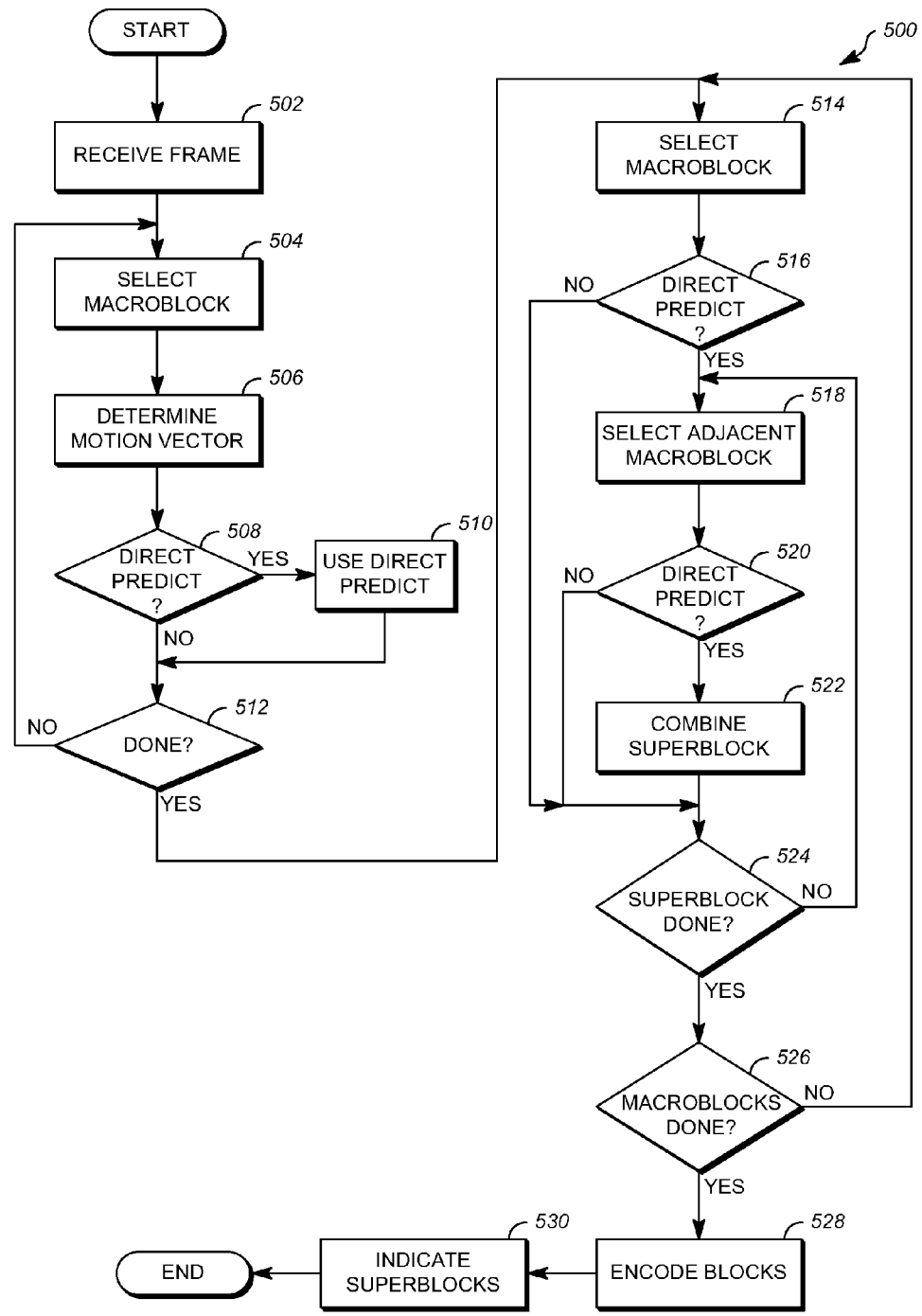
FIG. 5 is a flowchart of a method of operation for encoding a frame including superblocks in accordance with an implementation.

FIG. 5 is a flowchart of a method of operation 500 for encoding a frame including superblock in accordance with an implementation. Method of operation 500 can be implemented by a software program that is executed by a computing device such as transmitting station 12 or receiving station 30. For example, the software program can include machine-readable instructions that are stored in a memory such as memory 16 or memory 34, and that when executed by a processor, such as CPU 14 or CPU 32, cause the computing device to perform method of operation 500. Method of operation 500 can also be implemented using specialized hardware. As explained above, some computing devices may have multiple memories and multiple processors, and the steps of method of operation 500 may in such cases be distributed using different processors and memories. Use of the terms "processor" and "memory" in the singular encompasses computing devices that have only one processor or one memory as well as devices having multiple processors or memories that may each be used in the performance of some but not necessarily all of the recited steps.

The order in which steps are included in method of operation 500 is exemplary; the order of the steps can be changed without departing from the meaning of the disclosed implementations. For example, method of operation 500 shows the direct motion prediction being calculated for the macroblocks of the frame before superblocks are formed and then encoded. Alternatively, direct motion prediction can be calculated for the macroblocks as a superblock is formed, and the resulting superblock can be encoded before the next macroblocks are processed.

At step 502, a frame of a video stream is received by a computing device, such as transmitting station 12 that is implementing method of operation 500. The stream has a plurality of macroblocks that in some cases can be organized into frames. Each frame can capture a scene with multiple objects, such as people, background elements, graphics, text, a blank wall, or anything that can be represented in video data. Video data can be received in any number of ways, such as by receiving the video data over a network, over a cable, or by reading the video data from a primary memory or other storage device, including a disk drive or removable media such as a CompactFlash (CF) card, Secure Digital (SD) card, or the like.

In some implementations, a frame of the video stream may be further sub-divided into segments or slices that can be encoded and decoded separately. These segments or slices can represent subsets of the image data contained in a frame of the video stream or can represent the image data in multiple resolutions, for example. Disclosed implementations can operate on macroblocks in frames, segments or slices. Although examples used herein will refer to frames, the terms frames, segments or slices can be used interchangeably.

At step 504, a macroblock including, for example, 16×16 pixels is selected from the video frame. Macroblocks of a video frame can be selected in raster scan order starting from the upper left corner of the frame and proceeding along rows from left to right until the bottom right corner is reached, although other scan orders can be used. As used herein, the term "select" means to identify, construct, determine, specify or otherwise select in any manner whatsoever. At step 506, one or more motion vectors are calculated. A motion vector predicts the contents of a macroblock by comparing the contents of the macroblock with the translated contents of a corresponding block from a frame that can occur either before or in some cases after the frame containing the macroblock being processed (i.e., the current macroblock). If the difference between a translated macroblock from a temporally displaced frame and the current macroblock is sufficiently small, only the subtracted difference between the two macroblocks, called the residue or residual, is encoded. The encoded residue can include fewer bits when encoded, thereby saving bits in the encoded video stream.

At step 508, further bits in the encoded video stream can be saved by comparing the calculated motion vectors themselves to previously calculated motion vectors from the temporally displaced frame to see if direct motion vector prediction, also called direct prediction, can be used. For example, if the object represented in the portion of the video stream included in the current macroblock is moving smoothly and continuously with respect to the video frame, it can be expected that the motion vector that optimally predicts the current macroblock may also have predicted the temporally displaced macroblock. If the comparison between the motion vector of the current block and the motion vector of the temporally displaced block are similar within predetermined limits, the previously calculated motion vector can be re-used. Therefore, the motion vector of the current macroblock does not have to be included in the video stream and the macroblock can be encoded using direct prediction.

At step 510, method of operation 500 has determined that the motion vector of the current macroblock is similar enough to the motion vector of the temporally displaced block that direct prediction can be used. The current macroblock is designated as a direct prediction macroblock. Whether or not direct prediction can be used in response to the query of step 508, processing advances to step 512 where the macroblock can be indicated as using a type of motion prediction other than direct prediction. At step 512, method of operation 500 checks to see if any more macroblocks remain to be processed. If so, method of operation 500 loops back to select the next macroblock for processing at step 504. If no more macroblocks remain to be processed, method of operation 500 proceeds to step 514.

At step 514, each macroblock of the frame is again selected, for example, in raster scan order. At step 516, the current macroblock is tested to see if it has been designated at step 510 as being direct prediction macroblocks. If the current macroblock is a direct prediction macroblock, and if at least one adjacent macroblock is also a direct prediction macroblock, it is defined as a superblock by method of operation 500 and processing advances to step 518 to begin determining if other blocks should be added to the current superblock. If a macroblock is a direct prediction macroblock but is not adjacent to any other direct prediction macroblocks, the macroblock may be encoded and included in the bitstream as a macroblock rather than a superblock since there would be no bit savings in designating a macroblock as a superblock containing only one macroblock.

Figure 7:
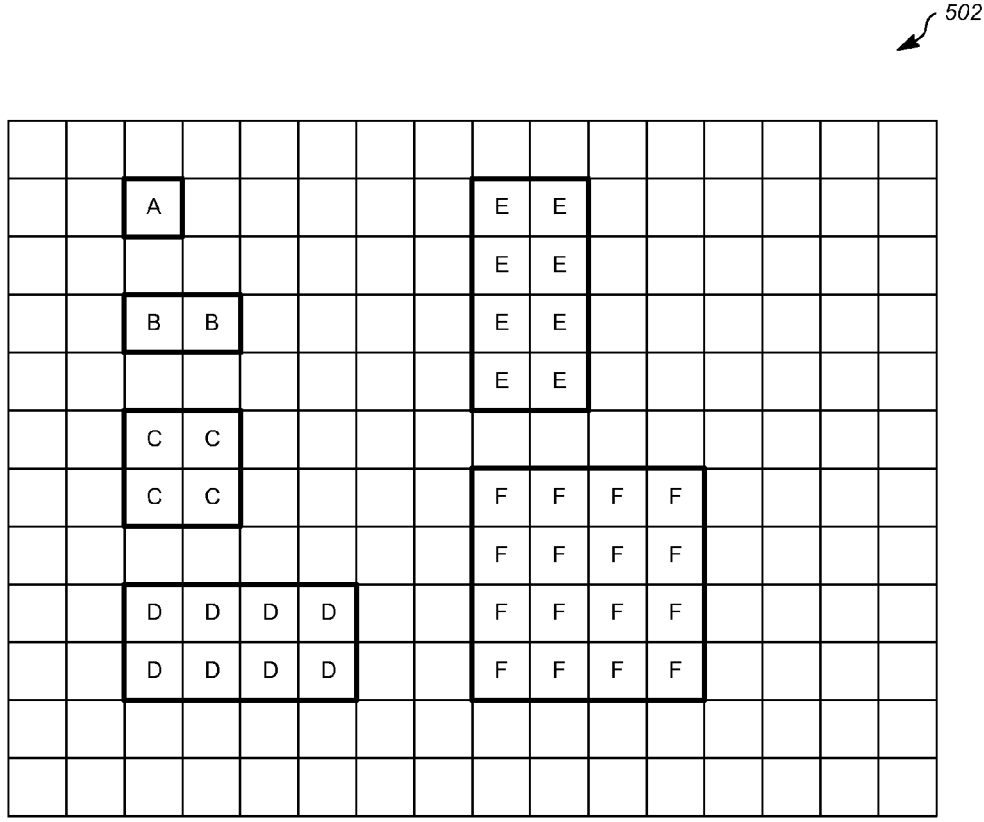
FIG. 7 is a diagram of a video frame showing example superblocks in accordance with an implementation.

At step 518, method of operation 500 selects a macroblock from the frame adjacent to the current superblock and, at step 520, the selected macroblock is tested to see if it is a direct prediction macroblock. If the selected macroblock is a direct prediction macroblock, it is combined with the current superblock at step 522. At step 524, method of operation 500 checks to see if any more macroblocks remain adjacent to the current expanded superblock up to a size limit, such as 64×64 pixels. If yes, the method of operation loops back to step 518 to select the next adjacent macroblock. The particular order in which adjacent macroblocks are considered is not limited. In one example, each adjacent block is tested and combined with the current superblock along a row or column until a block is reached that is not a direct prediction block in response to the query of step 520 or until the current superblock has reached its size limit. Once done with the current superblock in step 524, processing advances to step 526 to determine whether there is a block of the frame not included in a superblock. If there is, method of operation loops back to step 514, where the next macroblock not already included in a superblock is selected (e.g., in raster scan order). FIG. 7, described below, shows examples of superblocks.

If all macroblocks have been selected and tested to determine if they can be included in a superblock, the macroblocks and superblocks of the frame can be encoded by computing device 12 using an encoder such as encoder 70 in step 528. At step 530, method of operation 500 can insert bits into the encoded video stream to indicate which superblocks have been encoded using direct prediction and to indicate the size of the superblocks in order to permit a decoder to properly decode the frame. As used herein, the term "indicate" means to signify, identify, determine, specify, designate or otherwise indicate in any manner whatsoever.

In one example, a one-bit field can be defined in the frame or segment/slice header to indicate the direct prediction mode according to the following definitions in Table 1.

TABLE 1

| BIT VALUE | DEFINITION |
|---|---|
| 0 | Variable-sized superblock based on direct prediction is off; Normal coding syntax applies |
| 1 | Variable-sized superblock based on direct prediction is on; Use mode mapping table |

In an implementation, four superblock modes can be defined as shown in Table 2, below.

TABLE 2

| MODE | DEFINITION |
|---|---|
| Mode 0 | Direct prediction is on for the current superblock with a first pre-defined size |
| Mode 1 | Direct prediction is on for the current superblock with a second pre-defined size |
| Mode 2 | Direct prediction is on for the current superblock with a third pre-defined size |
| Mode 3 | Direct prediction is on for the current superblock with a fourth pre-defined size |

Three out of the four possible superblock modes are mapped into three superblock variable-length codes of "0," "10," and "11". The shortest 1-bit superblock variable length code, "0", can be used to map the most often used mode, while the other two 2-bit superblock variable length codes will be used for the second and third most frequently used sizes, respectively. For the fourth and less most frequently used superblock sizes, the superblock mode and its size can be specified by an indication field (e.g., indicating the coding mode) and two 2-bit fixed length fields as a multiplier to the macroblocks used to form the superblock. For example, a 32×32-bit superblock can have two 2-bit multiplier fields of binary 01 in the X-direction and binary 01 in the Y-direction. In another example, a superblock with a rectangular size of 64×32 pixels can have two 2-bit fields including a binary 11 for the X-direction and binary 01 for the Y-direction. Examples of other superblocks sizes are described in relation to FIG. 7.

Table 3 is an example of a 19-bit frame or segment/slice header "1 10 01 01 00 10 10 01 11 01" that specifies three superblock modes.

TABLE 3

| BIT # | VALUE | DEFINITION |
|---|---|---|
| 0 | 1 | Variable superblock based direction prediction is on |
| 1, 2 | 10 | Mode 2 is mapped to variable length code "0" |
| 3, 4, 5, 6 | 01 01 | Mode 2 superblock size is 32 × 32 |
| 7, 8 | 00 | Mode 0 is mapped to variable length code "10" |
| 9, 10, 11, 12 | 10 10 | Mode 0 superblock size is 48 × 48 |
| 13, 14 | 01 | Mode 1 is mapped to variable length code "11" |
| 15, 16, 17, 18 | 11 10 | Mode 1 superblock size is 64 × 32 |

This design permits using three different modes out of the four wherein the three modes can be mapped to use different superblock size. This permits using different superblock sizes to optimize the coding performance based on the statistics of each individual frame or segment/slice. It saves bits by introducing the capability to use the shortest 1-bit code to indicate the most often used superblock mode and its size. The choice of using different block sizes to represent a coded superblock is left to the optimization of different algorithms based on complexity and performance tradeoffs. Disclosed implementations use the largest superblock possible to the cover the areas that can use direct prediction by the previous frame motion vectors while keeping the residual errors under a predetermined threshold to minimize total bit spending.

As the superblocks are encoded and inserted into the encoded video stream, the individual superblock headers will contain one of the superblock variable length codes "0", "10" or "11" to indicate to the decoder how many macroblocks and in which configuration they are in. In cases where the superblock is of a size and configuration not covered by the three codes given above, a code will be included that indicates the size and configuration of the superblock in four-bit format, examples of which are described in relation to FIG. 7, below.

Figure 6:
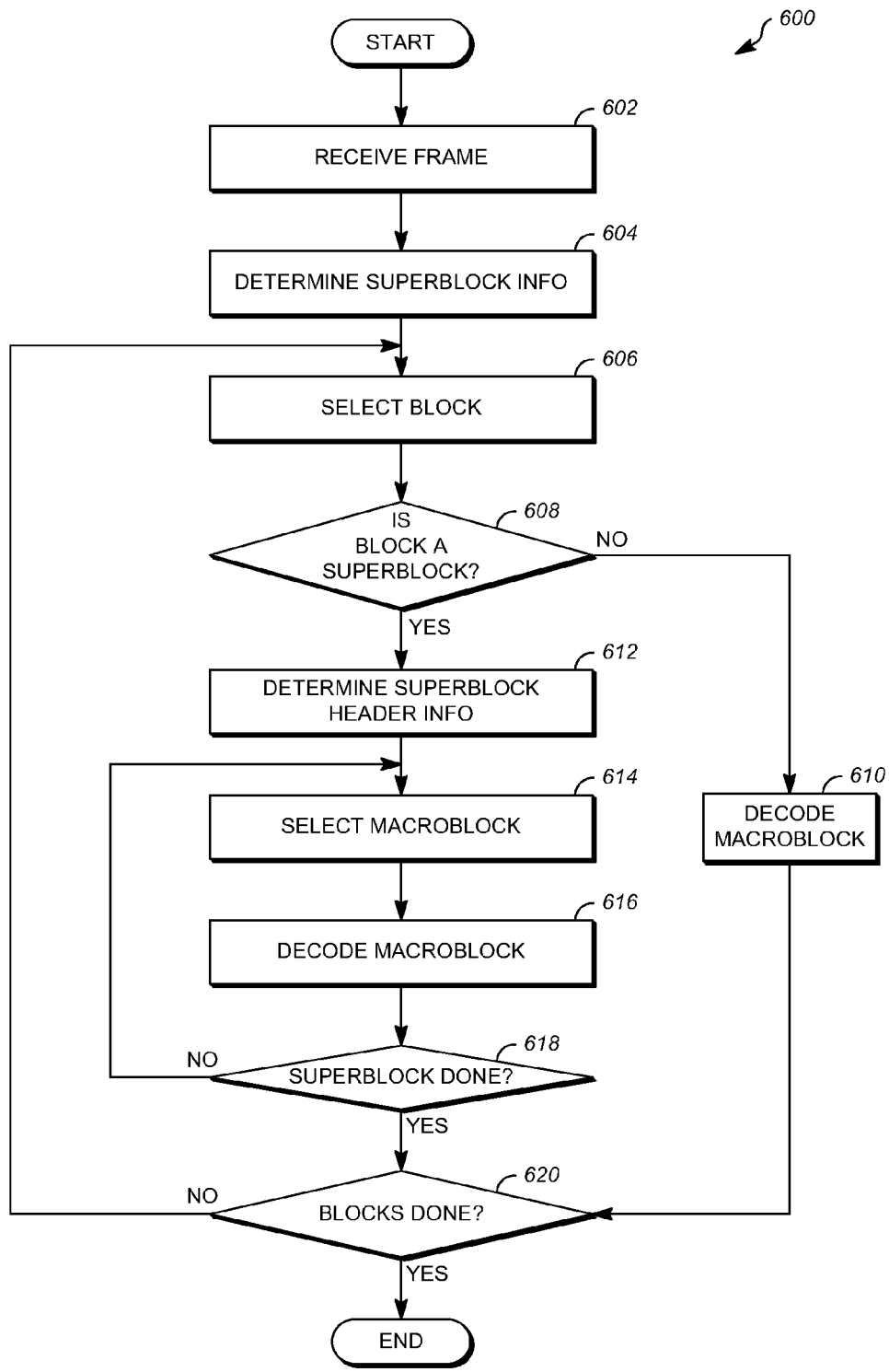
FIG. 6 is a flowchart of a method of operation for decoding a frame including superblocks in accordance with an implementation.

FIG. 6 shows a method of operation 600 for decoding a frame including superblocks in according with an implementation. Method of operation 600 can be implemented by a software program that is executed by a computing device such as transmitting station 12 or receiving station 30. For example, the software program can include machine-readable instructions that are stored in a memory such as memory 16 or memory 34, and that when executed by a processor, such as CPU 14 or CPU 32, cause the computing device to perform method of operation 600. Method of operation 600 can also be implemented using specialized hardware. As explained above, some computing devices may have multiple memories and multiple processors, and the steps of method of operation 600 may in such cases be distributed using different processors and memories.

The order in which steps included in method of operation 600 are presented is exemplary; the order of the steps can be changed without departing from the meaning of the disclosed implementations. For example, method of operation 600 shows macroblocks being selected and then decoded. However, all of the macroblocks can be selected or identified from the superblocks before being decoded.

At step 602, a frame of a video stream having superblocks is received by the computing device performing method of operation 600. At step 604, the frame, segment or slice header information describing the superblocks included in the frame as described in relation to Tables 1, 2 and 3, above, is determined by reading the header bits and decoding the information as described above.

At step 606, a block is selected from the frame. The block can be a macroblock or a superblock. Blocks can be read from the frame data in raster scan order as described above, or other scan orders can be used. If the block is not a superblock at next step 608, processing advances to step 610 to decode the macroblock (e.g., according to intra,inter or direct prediction). In contrast, if the block is a superblock at step 608, processing advances to step 612, where bits of the superblock header are read to determine the size and configuration of the superblock according to the encoding described above and in relation to FIG. 7, below. The determined size and configuration of the superblock indicates which motion predictors to use to decode the macroblocks included in the superblock. At step 614, a macroblock of the current superblock is selected to pass to a decoder, for example decoder 100, along with the determined motion prediction information, for decoding at step 616. Whether or not a block is a superblock can be determined by, for example, the lack of a superblock header.

At step 618, a query is made to determine if all macroblocks belonging to the current superblock are decoded. If not, method of operation 600 loops back to step 614 to select another macroblock for processing. If all macroblocks of the current superblock are decoded, method of operation 600 tests at step 620 to see if all blocks of the current frame are decoded. If not, method of operation 600 loops back to select another block for processing at step 606. If all blocks are decoded, method of operation 600 ends.

FIG. 7 shows several examples of superblocks defined on a portion of a frame 502. A macroblock marked "A" comprises 16×16 pixels in this example. Superblock sizes are denoted by multipliers to be applied to units of 16×16 pixels, or the size of a single macroblock. The superblock including the macroblocks marked "B" comprises 32×16 pixels, which can be denoted by the 4-bit scheme as "01 00." The superblock including macroblocks marked "C" represents 32×32 bits and is denoted by the 4-bit scheme as "01 01." The superblock including macroblocks marked "D" represents 64×32 bits and is denoted by the 4-bit scheme as "11 10." The superblock including macroblocks marked "E" represents 32×64 bits and is denoted by the 4-bit scheme as "01 11." Finally, the superblock including macroblocks marked "F" represents 64×64 pixels and is denoted by the 4-bit scheme as "11 11."

As described in relation to Tables 1, 2 and 3 above, in cases where these superblock sizes are among the first, second or third most frequently used sizes in a frame, they can be denoted by a one- or two-bit code. Where the superblock sizes are the fourth or less frequently used sizes in a frame, they would be denoted by 4-bit codes, examples of which are shown above.

According to the teachings of the present disclosure, a variable-size superblock for direct mode prediction is disclosed. This allows the use of larger size superblocks in direct mode prediction and thus saves mode indication overhead. Also, it gives the flexibility to use different sizes to cover different areas where motion vectors exhibit different behaviors. If direct mode will not save anything in a segment, a slice or a frame, the design provides flexibility to not use direct prediction mode at the slice, segment or frame levels, thus only wasting 1-bit for the given region. It gives the opportunity to fully explore the direct prediction mode for bit-savings frame by frame or slice by slice, and segment by segment.

The choice of using different block size to represent a coded superblock can be left to the optimization of different algorithms based on complexity and performance trade off. Desirably, a superblock as large as possible to cover the areas that can use direct prediction by the previous frame motion vectors can be used while keeping the residual errors under a certain threshold so that the total bit spending is reduced and/or minimized. Superblocks can also be implemented as non-rectangular, although the examples herein include rectangular superblocks. In such cases, bits in the superblock header may define a non-rectangular arrangement of macroblocks that are all to be encoded using direct prediction.

In some implementations, a macroblock not using direct prediction may be adjacent to or surrounded by macroblocks using direct prediction. In this case, the macroblock not using direct prediction can be changed to use direct prediction in order to permit a larger superblock to be constructed. The residual error of the macroblock that has been changed to direct prediction may be greater than without direct prediction. However, the savings in bits to be encoded in the bitstream due to forming a superblock can be large enough to fully offset the increase in bits due to the residual error, making such a change desirable.

The implementations of encoding and decoding described above illustrate some examples of encoding and decoding techniques. However, it is to be understood that encoding and decoding, as those terms are used in the claims, could mean compression, decompression, transformation, or any other processing or change of data.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The implementations of transmitting station 12 and/or receiving station 30 (and the algorithms, methods, instructions, etc., stored thereon and/or executed thereby, including by encoder 70 and decoder 100) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of transmitting station 12 and receiving station 30 do not necessarily have to be implemented in the same manner.

Further, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized that can contain other hardware for carrying out any of the methods, algorithms, or instructions described herein.

Transmitting station 12 and receiving station 30 can, for example, be implemented on computers in a video conferencing system. Alternatively, transmitting station 12 can be implemented on a server and receiving station 30 can be implemented on a device separate from the server, such as a hand-held communications device (i.e., a cell phone). In this instance, transmitting station 12 can encode content using an encoder 70 into an encoded video signal and transmit the encoded video signal to the communications device. In turn, the communications device can then decode the encoded video signal using a decoder 100. Alternatively, the communications device can decode content stored locally on the communications device, i.e., content that was not transmitted by transmitting station 12. Other suitable transmitting station 12 and receiving station 30 implementation schemes are available. For example, receiving station 30 can be a generally stationary personal computer rather than a portable communications device and/or a device including an encoder 70 may also include a decoder 100.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described aspects, implementations and embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream of frames, each frame having a plurality of macroblocks, comprising:
   determining a motion vector predictor for one or more macroblocks of a frame using a processor;
   generating a residual error for the one or more macroblocks using the motion vector predictor;
   deciding, based on the residual error, whether to encode the one or more macroblocks using direct prediction;
   combining those of the macroblocks to be encoded using direct prediction into at least one superblock, each superblock formed of at least two macroblocks to be encoded using direct prediction, wherein, for a first macroblock to be encoded using direct prediction, defining the first macroblock as a first superblock, determining whether an adjacent macroblock is to be encoded using direct prediction, and combining the adjacent macroblock with the first superblock when the adjacent macroblock is to be encoded using direct prediction and when the first superblock has not yet reached a predefined size limit;

encoding the at least one superblock using direct prediction into a bitstream; and including a variable length code in the bitstream that indicates a size of the at least one superblock.

2. The method of claim 1 wherein the at least one superblock is rectangular in shape.

3. The method of claim 1 wherein the variable length code includes one bit to describe a most frequent size for the at least one superblock in the frame.

4. The method of claim 1 wherein the variable length code includes two bits to describe each of a second and a third most frequent size for the at least one superblock in the frame.

5. The method of claim 1 wherein the variable length code defines a plurality of coding modes in a header of the frame, each of the coding modes defining a superblock size using two two-bit multiplier fields, a first one of the two-bit multiplier fields defining a number of macroblocks of a first dimension of the superblock and a second one of the two-bit multiplier fields defining a number of macroblocks of a second dimension of the superblock.

6. The method of claim 5 wherein including the variable length code in the bitstream that indicates the size of the at least one superblock comprises:

including one coding mode of the plurality of coding modes in a header of each encoded superblock having a size corresponding to the superblock sizes defined in the header of the frame; or including two two-bit fixed length fields in the header of each encoded superblock having a size not corresponding to the superblock sizes defined in the header of the frame, a first one of the two-bit fixed length fields defining a number of macroblocks of a first dimension of the superblock and a second one of the two-bit fixed length fields defining a number of macroblocks of a second dimension of the superblock.

7. The method of claim 1, further comprising:

including a single bit in a frame header in the bitstream indicating the at least one superblock encoded with direct prediction.

8. The method of claim 1 wherein combining those of the macroblocks to be encoded using direct prediction comprises:

continuing to combine macroblocks adjacent to the first superblock that are to be encoded using direct prediction in the first superblock until the first superblock has reached the predefined size limit.

9. The method of claim 1, further comprising:

encoding those of the plurality of macroblocks of the frame not to be encoded using direct prediction into the bitstream.

10. A method for decoding a video stream of frames, each frame having a plurality of macroblocks, comprising:

receiving a frame of a video stream to be decoded;

determining, based on a header of the frame, a variable length code defining sizes of one or more superblocks in the frame using a processor, each superblock formed of at least one macroblock encoded using direct prediction, wherein the one or more superblocks are formed by:

determining a motion vector predictor for one or more macroblocks of the frame, generating a residual error for the one or more macroblocks using the motion vector predictor, deciding, based on the residual error, whether to encode the one or more macroblocks using direct prediction, and combining those of the macroblocks to be encoded using direct prediction into the one or more superblocks;

selecting a superblock of the frame;

determining a size of the superblock based on a header of the superblock and the variable length code, a size of the superblock indicating a number of macroblocks belonging to the superblock; and decoding those macroblocks belonging to the superblock using direct prediction; and decoding any macroblocks of the frame that do not belong to the one or more superblocks.

11. The method of claim 10 wherein the variable length code includes one bit to describe a most frequent size for the one or more superblocks in the frame.

12. The method of claim 11 wherein the variable length code uses two bits to describe a second and a third most frequent size for the one or more superblocks in the frame.

13. The method of claim 1 wherein the variable length code defines a plurality of coding modes in a header of the frame, each of the coding modes defining a superblock size using two two-bit multiplier fields, a first one of the two-bit multiplier fields defining a number of macroblocks of a first dimension of a superblock and a second one of the two-bit multiplier fields defining a number of macroblocks of a second dimension of the superblock.

14. The method of claim 13 wherein determining the size of the superblock based on the header of the superblock and the variable length code comprises:

reading one coding mode of the plurality of coding modes in the header of the superblock when the superblock has a size corresponding to the superblock sizes defined in the header of the frame; or reading two two-bit fixed length fields in the header of the superblock when the superblock has a size not corresponding to the superblock sizes defined in the header of the frame, a first one of the two-bit fixed length fields defining a number of macroblocks of a first dimension of the superblock and a second one of the two-bit fixed length fields defining a number of macroblocks of a second dimension of the superblock.

15. The method of claim 10 wherein the one or more superblocks have a maximum size limit.

16. An apparatus for encoding a video stream of frames, each frame having a plurality of macroblocks, the apparatus comprising:

a memory; and a processor configured to execute instructions stored in the memory to:

determine a motion vector predictor for one or more macroblocks of a frame;

generate a residual error for the one or more macroblocks using the motion vector predictor;

decide, based on the residual error, whether to encode the one or more macroblocks using direct prediction;

combine those of the macroblocks to be encoded using direct prediction into at least one superblock, each superblock formed of at least two macroblocks to be encoded using direct prediction, wherein for a first macroblock to be encoded using direct prediction:

define the first macroblock as a first superblock;

determine whether an adjacent macroblock is to be encoded using direct prediction, and combine the adjacent macroblock with the first superblock when the adjacent macroblock is to be encoded using direct prediction and when the first superblock has not yet reached a predefined size limit;

encode the at least one superblock using direct prediction into a bitstream; and include a variable length code in the bitstream that indicates a size of the at least one superblock.

17. The apparatus of claim 16 wherein the variable length code includes one bit to describe a most frequent size for the at least one superblock in the frame, two bits to describe a second most frequent size for the at least one superblock in the frame and two bits to describe a third most frequent size for the at least one superblock in the frame.

18. The apparatus of claim 16 wherein the processor is configured to:

add a macroblock of the frame to a superblock when the macroblock is adjacent to another macroblock belonging to the superblock when a decision is made to encode the macroblock using direct prediction based on the residual error or a decision is made to encode the macroblock using other than direct prediction based on the residual error and a reduction in bits of encoding the macroblock as part of the superblock is at least equal to an increase in bits of encoding the macroblock as part of the superblock due to an increase in the residual error.

\* \* \* \* \*